United States Patent [19]

Hwang et al.

[11] Patent Number: 5,583,179

[45] Date of Patent: Dec. 10, 1996

[54] COMPOSITIONS OF POLY(PHENYLENE ETHER) RESINS AND POLYESTER RESINS

[75] Inventors: Chorng-Fure R. Hwang, Cary, N.C.; James J. Scobbo, Jr., Slingerlands; John B. Yates, Glenmont, both of N.Y.

[73] Assignee: General Electric Company, Pittsfield, Mass.

[21] Appl. No.: 474,822

[22] Filed: Jun. 7, 1995

[51] Int. Cl.$^6$ .............................. C08L 23/08; C08L 25/10; C08L 67/02; C08L 71/12

[52] U.S. Cl. .............................. 525/64; 525/68; 525/391; 525/396; 525/397; 525/905

[58] Field of Search .............................. 525/64, 68, 390, 525/391, 396, 397, 905

[56] References Cited

U.S. PATENT DOCUMENTS

| | | | |
|---|---|---|---|
| 4,315,086 | 2/1982 | Ueno et al. | 525/397 |
| 4,386,174 | 5/1983 | Cogswell et al. | 524/27 |
| 4,664,972 | 5/1987 | Connolly | 428/290 |
| 4,732,937 | 3/1988 | Sybert | 525/65 |
| 4,732,938 | 3/1988 | Grant et al. | 525/391 |
| 4,845,160 | 7/1989 | Sybert | 525/391 |
| 4,873,286 | 10/1989 | Gallucci et al. | 525/133 |
| 4,916,185 | 4/1990 | Yates, III et al. | 525/397 |
| 4,994,531 | 2/1991 | Brown et al. | 525/391 |
| 5,010,144 | 4/1991 | Phanstiel, IV et al. | 525/397 |
| 5,089,566 | 2/1992 | Brown et al. | 525/396 |
| 5,089,567 | 2/1992 | Phanstiel et al. | 525/397 |
| 5,096,967 | 3/1992 | Brown et al. | 525/68 |
| 5,096,979 | 3/1992 | Brown et al. | 525/396 |
| 5,110,896 | 5/1992 | Waggoner et al. | 528/190 |
| 5,132,361 | 7/1992 | Shea et al. | 525/66 |
| 5,132,373 | 7/1992 | Khouri et al. | 525/390 |
| 5,153,267 | 10/1992 | Brown et al. | 525/68 |
| 5,194,517 | 3/1993 | Blubaugh et al. | 525/396 |
| 5,210,191 | 5/1993 | Phanstiel et al. | 544/214 |
| 5,212,255 | 5/1993 | Khouri et al. | 525/391 |
| 5,214,099 | 5/1993 | Khouri et al. | 525/149 |
| 5,247,006 | 9/1993 | Khouri et al. | 524/508 |

FOREIGN PATENT DOCUMENTS

| | | |
|---|---|---|
| 0438128A2 | 7/1991 | European Pat. Off. . |
| 04202462A | 7/1992 | Japan . |
| 04202461A | 7/1992 | Japan . |
| 06041400A | 7/1992 | Japan . |
| 05086266A | 4/1993 | Japan . |
| 05117505A | 5/1993 | Japan . |

*Primary Examiner*—Thomas Hamilton, III

[57] ABSTRACT

Compatible blends of poly(phenylene ether) resins and polyester resins are provided comprising electrophile-containing poly(phenylene ether) resins, polyester resins and an impact modifier mixture comprising a functionalized polyolefin-based resin and an elastomeric block copolymer to afford articles having good impact, ductility and tensile properties. The compositions may further comprise reinforcing agents, flame retardants, and flow promoters. Articles made from the compositions are useful for automotive components.

15 Claims, 3 Drawing Sheets

COMPOSITIONS OF POLY(PHENYLENE ETHER) RESINS AND POLYESTER RESINS

This invention relays to compatible blends of poly(phenylene ether) resins, thermoplastic polyesters, and an impact modifier mixture comprising a functionalized polyolefin-based resin and an elastomeric block copolymer. The compositions exhibit enhanced properties, such as improved impact and delamination resistance.

BRIEF DESCRIPTION OF RELATED ART

Poly(phenylene ether) resins (referred to hereafter as "PPE") are commercially attractive materials because of their unique combination of properties, including for example, high temperature resistance, dimensional and hydrolytic stability and electrical properties. Furthermore, the combination of PPE with polyesters into compatible PPE-polyester blends has been sought after for additional overall properties such as, for example, chemical resistance, high strength and high flow. Examples of such compatibilized blends can be found in U.S. Pat. Nos. 4,845,160, 5,089,566, 5,153,267, 5,247,006, 5,010,144 and 5,089,56, which are incorporated herein by reference. The overall physical properties of these blends can be further enhanced by the addition of various additives such as impact modifiers, heat stabilizers, antioxidants and fillers. The physical properties of compatibilized blends comprising PPE and polyesters makes them attractive for a variety of end-use articles in the automotive market requiring heat and chemical resistance, toughness, and stress. With the ever increasing emphasis on quality improvement within the automotive market, improved physical properties, especially impact resistance, processability and strength, remain major goals for suppliers of plastic materials.

Accordingly, there is a need to provide an impact modified polyester/poly(phenylene ether) resins composition which exhibits an impact modifier distribution morphology which results in enhanced mechanical properties, for example, enhanced notched Izod impact properties.

SUMMARY OF THE INVENTION

The needs discussed above have been satisfied by the surprising discovery of an improved thermoplastic composition which comprises:

(A) an electrophile-containing poly(phenylene ether) resin;

(B) a thermoplastic polyester resin; and (C) an impact modifier mixture comprising a functionalized polyolefin-based resin and an elastomeric block copolymer.

The compositions exhibit an impact modifier distribution morphology which provides enhanced mechanical properties. In preferred embodiments, the present invention provides compatibilized PPE-polyester compositions that are free of visual signs of lamination, have improved phase morphology stabilization and possess good impact and tensile properties. The description which follows provides further details regarding this invention.

DETAILED DESCRIPTION OF THE INVENTION

Figure 1:
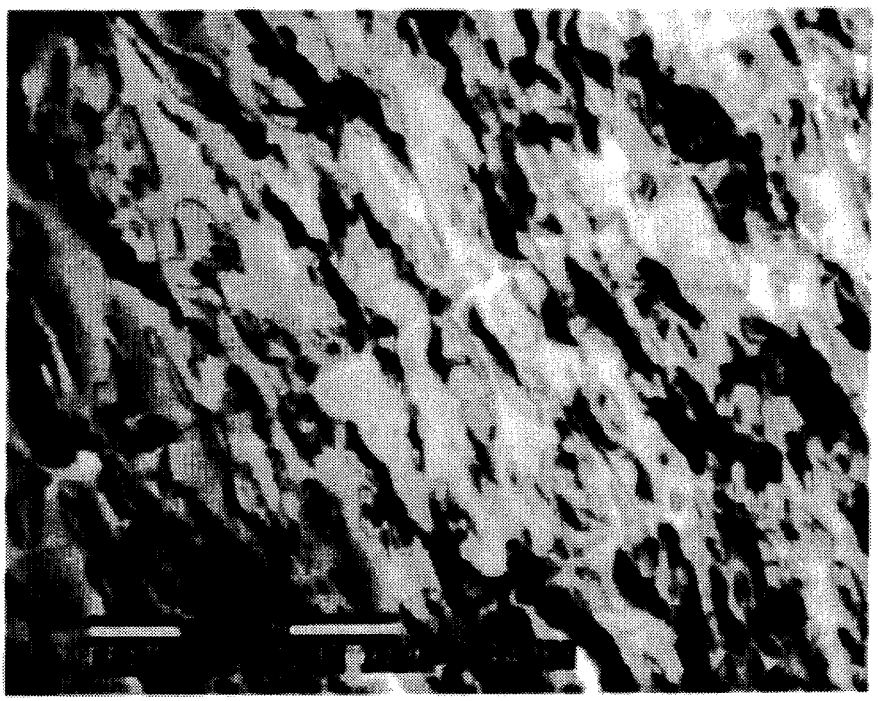
FIG. 1 is a transmission electron micrograph depicting the morphology of Sample 8, containing an elastomeric block copolymer without a functionalized polyolefin-based resin.

PPE, per se, are known polymers comprising a plurality of structural units of the formula (I):

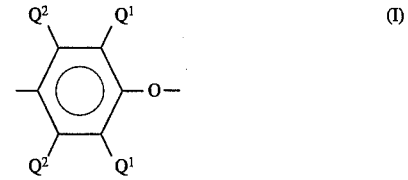

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes, as well as coupled PPE in which coupling agents such as low molecular weight polycarbonates, quinones, heterocycles and formals undergo reaction in known manner with the hydroxy groups of two PPE chains to produce a higher molecular weight polymer.

The PPE generally have a number average molecular weight within the range of about 3,000–40,000 and a weight average molecular weight within the range of about 20,000–80,000, as determined by gel permeation chromatography. The intrinsic viscosity is most often in the range of about 0.15–0.6 dl./g., as measured in chloroform at 25° C.

The PPE are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful PPE for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halidesecondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the PPE contemplated for use in the present invention include all those presently known, irrespective of variations in structural units or ancillary chemical features.

It is preferable for at least some of the PPE to be an "electrophile-containing PPE." These electrophile-containing PPE are sometimes referred to as "functionalized PPE." In the final blend, the electrophile-containing or functionalized PPE are commonly referred to as "compatibilized PPE" because of the resultant improved compatibility between the PPE and the other components. Accordingly, appropriate electrophile-containing PPE are those which affect the compatibility between the PPE and the various components of the blend (e.g., the PPE and the polyester resin). Compatibility is meant to include the stabilization of gross phase separation between the components of the blend. Indicators of improved compatibilization include, for example, increased tensile properties, reduced lamination tendency, increased ductility and improved phase morphology stabilization. It is believed that the electrophile-containing PPE contains moieties capable of reacting with, for example, the carboxylic acid or hydroxyl endgroups of the polyesters to afford PPE-polyester copolymers. Presumably the PPE-polyester copolymers act in part as compatibilizers for the unbound PPE and polyester in helping to provide stabilization of the morphology of the composition. It is through the effect of improving the compatibility of the blend components which determines, in part, the desirable physical properties, including chemical and flash resistance, of the blend.

One way to prepare appropriate electrophile-containing PPE is to functionalize PPE by reacting PPE with at least one compound having at least one electrophilic moiety. An example of a useful electrophilic moiety is epoxy. One method for preparing an appropriate epoxy-type PPE involves reacting PPE with various compounds containing both an acyl group and at least one epoxy group in a non-reactive solvent for PPE as exemplified in U.S. Pat. No. 4,732,937, which is incorporated herein by reference. Another useful method for preparing an appropriate epoxy-type PPE involves reacting PPE with various epoxy chlorotriazine compounds in a non-reactive solvent for PPE. The capped electrophile-containing PPE may be isolated by conventional techniques, such as precipitation with a nonsolvent. Non-limiting examples of these compounds include 2-chloro-4,6-diglycidoxy-1,3,5-triazine; 2-chloro-4-(n-butoxy)-6-glycidoxy-1,3,5-triazine; and 2-chloro-4-(2,4,6-trimethylphenoxy)-6-glycidoxy-1,3,5-triazine, also known as mesityl glycidyl chlorocyanurate (MGCC.). Methods to prepare these compounds and functionalized PPE resins can be found in U.S. Pat. Nos. 4,461,871, 4,895,945, 5,041,504, 5,089,566, 5,096,979, and 5,132,373; all of which are incorporated herein by reference.

Other electrophile-containing PPE useful for the present invention are orthoester functional PPE. The term "orthoester" is meant to refer to a compound in which one carbon atom is attached to another by a direct carbon-carbon bond, and to three further carbon atoms through oxygen. Such compounds can be considered to be esters of the hypothetical ortho acids $R-C(OH)_3$, wherein R is an organic radical. The existence of such ortho acids is for the most part unknown, since they immediately dehydrate to conventional carboxylic acids. However, esters of such acids are known and the compositions of this invention include certain polymer substituted esters of this type.

The orthoester electrophile-containing PPE preferably contain orthoester moieties represented by the formula (II):

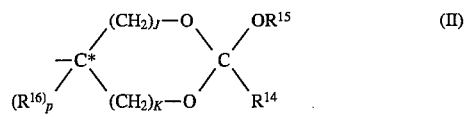

wherein $R^{15}$ is a $C_{1-4}$ primary or secondary alkyl radical or is an alkylene radical forming a second 5- or 6-member ring with $C^*$; $R^{14}$ is a $C_{1-4}$ primary or secondary alkyl or $C_{6-10}$ aromatic radical, or $R^{14}$ and $R^{15}$ together with the atoms connecting them form a 5-, 6- or 7-member ring; $R^{16}$ is hydrogen or $C_{1-4}$ primary or secondary alkyl; K is 0 or 1; J is from 1 to 2-K; and p is 0 when $R^{15}$ and $C^*$ form a ring and is otherwise 1.

The $R^{15}$ radical may be a $C_{1-4}$ primary or secondary alkyl radical such as methyl, ethyl, n-propyl, isopropyl, n-butyl, isobutyl or secondary butyl. Primary radicals and especially the methyl radical are generally preferred. It is also possible for $R^{15}$ to form a second 5- or 6-member ring with other portions of the molecule. For this purpose, one of the carbon atoms in the orthoester ring is designated $C^*$ to indicate its role as part of said second ring.

The $R^{14}$ value may be a $C_{1-4}$ primary or secondary alkyl radical as defined above for $R^{15}$ or a $C_{6-10}$ aromatic (preferably aromatic hydrocarbon) radical. Finally, it is possible for $R^{14}$ and $R^{15}$ together to form a 5-, 6- or 7-member ring with the atoms connecting them. The $R^{16}$ radical may be hydrogen or an alkyl radical similar to $R^{14}$ and $R^{15}$. It is preferably hydrogen.

The values of J and K depend on whether the cyclic orthoester moiety is a 5-member or 6-member ring. In general, 5-member rings are preferred; that is, K is 0 and J is 1. However, the invention also includes compositions in which a 6-member ring is present, which requires either that J and K both be 1 or that K be 0 and J be 2.

The value of the subscript p also depends on the cyclic structure of the orthoester moiety. If $C^*$ is part of a ring structure with $R^{15}$, all four valences thereof are satisfied and p will be 0. If this is not the case, p will be 1.

The following is an illustrative orthoester moiety (III) which may be present in the orthoester electrophile-containing PPE:

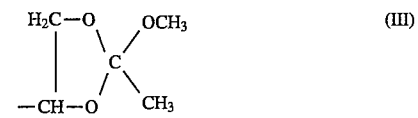

and which may also be referred to as a 4-(2-methoxy-2-methyl-1,3-dioxolanyl) radical and is usually preferred. Intermediates for preparation of such compounds include 4-hydroxymethyl-2-methoxy-2-methyl-1,3-dioxolane, which is obtainable by the reaction of glycerol and methyl ortho acetate. An improved method for the preparation of this and structurally related compounds in substantially pure form and the products thus obtained are disclosed in U.S. Pat. No. 5,231,197, which is incorporated herein by reference.

The PPE having orthoester functional moieties is preferably prepared by melt extrusion of PPE with at least one graftable ethylenically unsaturated orthoester monomer. The functional orthoester monomer may be represented by the general formula (IV):

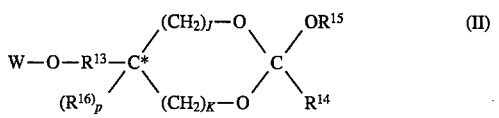

wherein the $R^{14}$, $R^{15}$, $R^{16}$, J, K, p and C* are as previously defined, $R^{13}$ is a $C_{1-6}$ alkylene radical and W is a graftable unsaturated group represented by the following formula (V)

wherein each $R^{11}$ may independently be hydrogen, or a $C_{1-8}$ radical, or substituted derivatives thereof; or an aryl radical, or substituted derivative thereof. Each $R^{11}$ can also be other groups, provided that the group is inert to the orthoester. The value of m may be 1 or greater. $R^{12}$ can be one of the following formulae (VI):

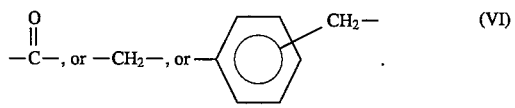

Illustrative examples of monomers which may be employed in the present invention include 4-acryloyloxymethyl-2-methoxy-2-methyl-1,3-dioxolane, 4-methacryloyloxymethyl-2-methhoxy-2-methyl-1,3--dioxolane, 4-acryloyloxymethyl-2-methoxy-2-phenyl-1,3-dioxolane and the isomeric mixture of 4-(2-methoxy-2-methyl-1,3--dioxolanyl)methyl vinylbenzyl ethers. Methods for the preparation of illustrative orthoester materials and their reaction with PPE can be found in U.S. Pat. Nos. 5,132,373, 5,142,049, 5,171,866, 5,153,290, 5,212,255, and 5,247,006; which are all incorporated herein by reference.

Preferably the graftable unsaturated orthoester monomer is of the formula (VII):

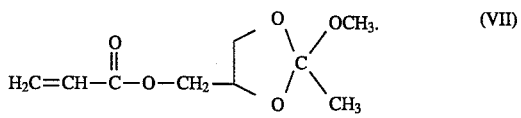

Another preferred graftable unsaturated orthoester monomer is represented by the formula (VIII):

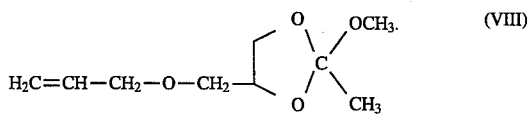

It is sometimes advantageous to use an initiator in the preparation of the electrophile-containing PPE with graftable unsaturated electrophile-containing compounds. Suitable initiators for use in the current invention include free radical initiators generally known in the art. Specific initiators include various peroxides and hydroperoxides. Specific examples include benzoyl peroxide, dicumyl peroxide, 2,5-di(t-butylperoxy)hexane, 2,5-dimethyl-2,5-di(t-butylperoxy)hexyne-3 and cumene peroxide, with 2,5-dimethyl-2,5-di(t-butylperoxy)hexyne-3 being preferred. When it is used, the amount of initiator used can vary from about 0.05 weight percent to about 0.5 weight percent relative to the weight of the PPE.

Orthoester derivatives of chlorotriazine compounds, as previously noted for epoxy groups, are also useful including 2-chloro-4-(2-methoxy-2-methyl-1,3--dioxolanyl)methoxy-6-phenoxy-1,3,5-triazine, for example. References to prepare appropriate triazine compounds can be found in U.S. Pat. No. 5,132,373, which is incorporated herein by reference.

It is also sometimes advantageous to employ at least one lubricant which is substantially inert to the electrophile-containing agent and other ingredients in the melt preparation of an electrophile-containing PPE. The presence of the lubricant decreases the required melt processing temperature to produce the electrophile-containing PPE, as well as the compatibilized blends prepared therefrom. As a result, gel formation is minimized.

Suitable lubricants will be apparent to those skilled in the art; in general, they are solids with high lubricity or relatively low melting solids or oils. The hydrogenated poly(α-olefins) are often preferred and the most preferred hydrogenated poly(α-olefins) are those having kinematic viscosities of about 2–20 centistokes and especially 8–12 centistokes at 100° C., as determined by ASTM procedure D445. They are commercially available from such companies as Henkel Corporation under the tradename EMERY fluids.

The hydrogenated poly(α-olefins) are generally used in a lubricating amount. The lubricating amount, based on the weight of the PPE, is generally in the range of about 1% to about 5% by weight and preferably about 2% to about 4% by weight.

The amount of the above mentioned electrophile-containing functionalizing agents that is required to appropriately functionalize the PPE is that which is sufficient to improve the compatibility between the various components in the composition. As previously discussed, indications of improved compatibility include resistance to lamination, improved physical properties such as increased tensile and impact properties, enhanced chemical and flash resistance, and a stabilized morphology between the blend component phases under static or low shear conditions. An effective amount, based on the amount of the PPE, is generally up to about 10% by weight, and is preferably from about 0.05% to about 8% by weight. In the most preferred embodiments, the amount of the functionalizing agent is in the range from about 0.1% to about 5% by weight based on the amount of the PPE. The actual amount utilized will also depend, in part, on the molecular weight of the electrophile-containing functionalizing agent, the number and type of reactive species per molecule of electrophile-containing functionalizing agent and the degree of compatibility that is desired in the final PPE-polyester resin blend.

Polyesters suitable for use as Component B of the present compositions include those comprising structural units of the formula (IX):

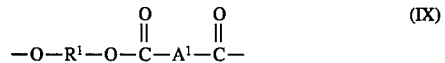

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of formula (IX) are poly(alkylene dicarboxylates), elastomeric polyesters, liquid crystalline polyesters, polyarylates, and polyester copolymers such as copolyestercarbonates and polyesteramides. Also included are polyesters that have been treated with relatively low levels of diepoxy or multi-epoxy compounds. It is also possible to use a branched polyester in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make a branched polyester. Furthermore, it is sometimes desirable to have various concentrations of acid and hydroxyl endgroups on the polyester, depending on the ultimate end-use of the composition.

It is preferred for at least some of the polyester to contain nucleophilic groups such as, for example, carboxylic acid groups. In some instances, it is desirable to reduce the number of acid endgroups, typically to less than about 30 micro equivalents per gram, with the use of acid reactive species. In other instances, it is desirable that the polyester has a relatively high carboxylic end group concentration, e.g., about 5–250 micro equivalents per gram or, more preferable, about 20–70 micro equivalents per gram The $R^1$ radical may be, for example, a $C_{2-10}$ alkylene radical, a $C_{6-10}$ alicyclic radical, a $C_{6-20}$ aromatic radical or a ployoxyalkylene radical in which the alkylene groups contain about 2–6 and most often 2 or 4 carbon atoms. The $A^1$ radical in the above formula (IX) is most often p-or m-phenylene or a mixture thereof. This class of polyesters includes the poly(alkylene terephthalates), the poly(alkylene naphthalates) and the polyarylates. Polyesters are known in the art as illustrated by the following U.S. Patents, which are incorporated herein by reference.

| | | | |
|---|---|---|---|
| 2,465,319 | 2,720,502 | 2,727,881 | 2,822,348 |
| 3,047,539 | 3,671,487 | 3,953,394 | 4,128,526 |

The poly(alkylene terephthalates), for example, poly(ethylene terephthalate) (commonly abbreviated as "PET"), poly(cyclohexyldimethanol terephthalate) (commonly abbreviated as "PCT"), and poly(butylene terephthalate) (commonly abbreviated as "PBT") are examples of suitable polyesters for the present invention. Additional suitable polyesters include poly(alkylene naphthalate)s such as, for example, poly(alkylene-2,6-naphthalate)s including poly-(butylene-2,6-naphthalate) (commonly abbreviated "PBN") and poly(ethylene-2,6-naphthalate) (commonly abbreviated "PEN"). Liquid crystalline polyesters having melting points less that about 380° C. and comprising recurring units derived from aromatic diols, aliphatic or aromatic dicarboxylic acids, and aromatic hydroxy carboxylic acids are also useful. Examples of useful liquid crystalline polyesters are those described in U.S. Pat. Nos. 4,664,972 and 5,110, 896, which are incorporated herein by reference. Various mixtures of polyesters are also sometimes very suitable.

The various polyesters can be distinguished by their corresponding glass transition temperatures (e.g., Tg) and melting points (e.g., Tm). The liquid crystalline polyesters generally have Tg's and Tm's that are higher than the naphthalate-type polyesters. The naphthalate-type polyesters generally have Tg's and Tm's that are higher than the terephthalate-type polyesters. Thus, the resultant PPE alloys with the liquid crystalline or naphthoate-type polyesters are typically better suited to applications requiring higher temperature resistance than are the terephthalate-type polyesters. The PPE alloys with terephthalate-type polyesters are generally easier to process due to the polyesters' lower Tg's and Tm's. Selection of the polyester or blend of polyesters utilized is therefore determined, in part, by the desired property profile required by the ultimate end-use application for the PPE-polyester alloy.

The polyester may include structural units of the formula (X):

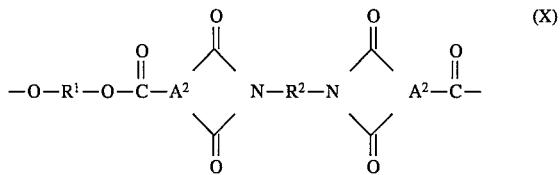

wherein $R^1$ is as previously defined. $R^2$ is a polyoxyalkylene radical and $A^2$ is a trivalent aromatic radical, usually derived from trimellitic acid and has the structure (XI):

Such polymers and their mode of preparation are described for example in U.S. Pat. Nos. 4,544,734, 4,556,705, and 4,556,688, which are incorporated herein by reference.

Because of the tendency of polyesters to undergo hydrolytic degradation at the high extrusion and molding temperatures encountered by the compositions of this invention, it is preferred that the polyester be substantially free of water. The polyester may be predried before admixing with the other ingredients. More commonly, the polyester is used without predrying and the volatile materials are removed through the use of vacuum venting the extruder.

The polyesters generally have number average molecular weights in the range of about 20,000–70,000, as determined by intrinsic viscosity (I.V.) at 30° C. in a 60:40 by weight mixture of phenol and 1,1,2,2-tetrachloroethane.

The functionalized polyolefin based impact modifier preferably contains at least one species selected from the group consisting of orthoester, epoxy, and mixtures of the two. Useful functionalized polyolefin-based resins used in the present invention include epoxy functional polyolefins, especially epoxy functional elastomers. One type of epoxy functional elastomer are the copolymers of an α-olefin with a glycidyl ester of an α,β-unsaturated carboxylic acid. α-Olefin as used herein means ethylene, propylene, butene-1, etc. Among them, ethylene is preferred. The glycidyl esters of the α,β-unsaturated acids are compounds of the general formula (XII):

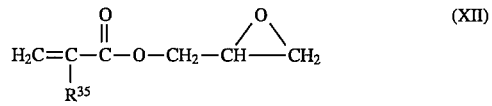

wherein $R^{35}$ represents a hydrogen atom or a lower alkyl group. Examples of the glycidyl esters of α,β-unsaturated acids include glycidyl acrylate, glycidyl methacrylate and glycidyl ethacrylate. The epoxy functional olefinic elastomer is preferably an olefinic copolymer containing of from about 60% to about 99.5% by weight of an α-olefin and of from about 0.5% to about 40% by weight, preferably of from about 3% to about 30% by weight, of a glycidyl ester of an α,β-unsaturated carboxylic acid based on the weight of the elastomer's composition. When the amount of the glycidyl ester is less than about 0.5% by weight, no intended effects can be obtained and when it exceeds about 40% by weight, gelation occurs during melt-blending resulting in degradation of the extrusion stability, moldability and mechanical properties of the product. Suitable epoxy functional α-olefin elastomers include: ethylene-glycidyl acrylate copolymers, ethylene-glycidyl methacrylate copolymers, ethylene-glycidyl methacrylate-vinyl acetate terpolymers, ethylene-glycidyl methacrylate-methyl acrylate terpolymers, ethylene-ethyl acrylate-glycidyl methacrylate terpolymers. Preferred epoxy functional α-olefin elastomers include ethylene-glycidyl acrylate copolymers and ethylene-glycidyl methacrylate copolymers. Useful epoxy functional elastomers include those sold by Sumitomo Chemical Co., Ltd. under the trademarks IGETABOND and BONDFAST and also from Elf Atochem under the trademark LOTADER.

Other useful functionalized polyolefin-based resins in the present invention are the orthoester functional polyolefins, especially orthoester functional elastomers. The orthoester functional polyolefins preferably comprise structural units of the formula (XIII):

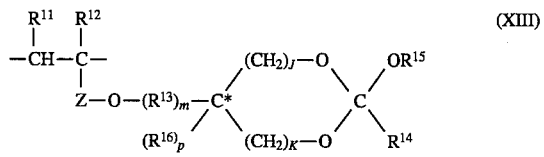

wherein $R^{11}$ is hydrogen, $C_{1-6}$ alkylene or a $C_{6-10}$ aromatic radical;

$R^{12}$ is hydrogen or

Z is a substantially, inert linking group;

$R^{13}$ is an unsubstituted or substituted alkylene or a $C_{6-10}$ aromatic radical;

m is 0 or 1;

and wherein $R^{14}$, $R^{15}$, $R^{16}$, K, J, p and C* are as previously defined for Formula (II).

A large number of orthoester functional olefin-based resins are useful for the present invention. These include, for example, orthoester functional poll,reefs of lower alkyl, olefins including linear low density polyethylene, low density polyethylene; and olefin-acrylate ester and methacrylate ester copolymers including ethylene-methyl acrylate copolmers and ethylene-ethyl acrylate copolymers. The preferred orthoester functional olefin-based resins include those made from copolymers comprising ethylene and propylene, including copolymers additionally comprising non-conjugated dienes. These copolymers are commonly, referred to as EPDM resins. Methods illustrating preparations of ortho ester functional olefin-based resins are disclosed in, for example, U.S. Pat. Nos. 5,153,290 and 5,171,866, both of which are incorporated herein by, reference. The level of orthoester functionality within the orthoester functionalized polyolefin-based resins generally is from about 0.5% to about 10% by weight of a graftable orthoester species, preferably from about 1% to about 5% by weight, based on the weight of the polyolefin-based resin. The exact amount of orthoester functionality required is dependent on such factors as the molecular weight of the graftable orthoester compound, the number and types of nucleophiles present in the blend components, and the ultimate physical properties required for the blend composition, among other factors.

It is also possible to blend the functionalized polyolefin-based resin with various non-functionalized polyolefins such as, for example, linear low density polyethylene (commonly abbreviated "LLDPE"), polypropylene and ethylene-propylene copolymers.

The elastomeric block copolymers are preferably derived from alkenyl aromatic compounds and dienes. The block copolymers typically comprise monoalkenyl arene (usually styrene) blocks and conjugated diene (e.g. butadiene or isoprene) blocks and are represented as AB or ABA block copolymers. The conjugated diene blocks may be selectively hydrogenated. The block copolymers are typically diblock, triblock or radial teleblock, or mixtures thereof. The block copolymers may also comprise tapered blocks.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylene-propylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254, 3,402,159, 3,297,793, 3,265,765 and 3,594,452 and U.K. Patent 1,264,741, all incorporated herein by reference. Examples of typical species of AB block copolymers include polystyrene-polybutadiene (SBR), polystyrene-poly(ethylene propylene) (S-EP), polystyrene-polyisoprene and poly(α-methylstyrene)-polybutadiene. Such AB block copolymers are available commercially from a number of sources, including Phillips Petroleum under the trademark SOLPRENE, from the Shell Chemical Co. under the trademark KRATON, and from Kuraray under the trademark SEPTON.

Additionally, ABA triblock copolymers and processes for their production as well as hydrogenation, if desired, are disclosed in U.S. Pat. Nos. 3,149,182, 3,231,635, 3,462,162, 3,287,333, 3,595,942, 3,694,523 and 3,842,029, which are all incorporated herein by reference.

Examples of triblock copolymers include, e.g., polystyrene-polybutadiene-polystyrene (SBS), polystyrene-polyisoprene-polystyrene (SIS), poly(α-methyl-styrene)-polybutadiene-poly(α-methylstyrene) and poly(α-methylstyrene)-polyisoprene-poly(α-methylstyrene).

Particularly preferred triblock copolymers are available commercially from Shell Chemical Co. under the trademarks CARIFLEX and KRATON. The preferred triblock copolymer is G1651 from Shell Chemical Company; the preferred diblock copolymers are G1702 or G1701 from Shell Chemical Company.

The resulting compositions may exhibit either a matrix phase of polyester having small PPE particles dispersed therein or a matrix of PPE having small polyester particles dispersed within, and having the functionalized polyolefin-based resin and the elastomeric block copolymer located within the PPE and polyester phases. When only a functionalized polyolefin-based resin is utilized as the impact modifier, the functionalized polyolefin-based resin appears to be located mainly within the polyester phase. Conversely, when only an elastomeric block copolymer is utilized as the impact modifier, the elastomeric block copolymer appears to be located mainly within the PPE phase. When the mixture is utilized, the morphology with the dual impact modifiers changes such that the elastomeric block copolymer appears to more associated with the interface of the PPE with the polyester. It also appears that some of the elastomeric block copolymer may even reside within or be associated with the functionalized polyolefin-based resin. It is believed that the morphology of the mixture of the functionalized polyolefin-based resin and elastomeric block copolymer is responsible, in part, for the surprisingly enhanced impact properties, especially impact properties. The expected result is for the functionalized polyolefin-based resin to be randomly dispersed in the polyester and the elastomeric block copolymer to be randomly dispersed in the PPE. Furthermore, the present compositions exhibit enhanced heat distortion temperatures at high loads (264 psi), exhibit reduced shrink, and exhibit reduced flash during molding over compositions lacking the electrophile-containing PPE. As previously mentioned, the present compositions exhibit unexpected enhanced mechanical properties, for example, notched Izod impact strengths.

The compositional ratios of the present invention can range from a level of about 10% to about 95% by weight of electrophile-containing PPE, about 10% to about 95% by weight of polyester, about 1% to about 20% by weight of functionalized polyolefin-based resin and about 1% to about 20% by weight of elastomeric block copolymer in which all percent by weight ranges are based upon the total weight of the composition.

It is generally preferable for the ratio of the polyester and the electrophile-containing PPE to be such that the polyester is the continuous phase. Preferably the polyester and the electrophile-containing PPE are in a weight ratio of between about 75:25 (polyester:electrophile-containing PPE) and about 30:70, more preferably between about 70:30 and about 50:50. Preferably the functionalized polyolefin-based resin and the elastomeric block copolymer are in the composition in a weight ratio of between about 15:2 and about 5:10, more preferably between about 12:3 and about 6:6, and most preferably between about 10:6 and about 7:5. Determination of an exact ratio for a composition is, in part, determined by the intended ultimate end-use application of the composition and the necessary properties needed for the application.

The composition preferably comprises the electrophile-containing PPE at a level, expressed as percentages by weight of the PPE, polyester, functionalized polyolefin-based resin and elastomeric block copolymer, of from about 10% to about 60% by weight or more, more preferably between about 25% to about 40% by weight, and most preferably from about 30% to about 35% by weight. The composition preferably comprises the polyester at a level, expressed as percentages by weight of the PPE, polyester, functionalized polyolefin-based resin and elastomeric block copolymer, of from about 25% to about 85% by weight, more preferably from about 40% to about 65% by weight, and most preferably from about 50% to about 60% by weight. The composition preferably comprises the functionalized polyolefin-based resin at a level, expressed as percentages by weight of the PPE, polyester, functionalized polyolefin-based resin and elastomeric block copolymer, of about 2% to about 18% by weight based on the total weight of the composition, more preferably from about 4% to about 15% by weight, and most preferably from about 5% to about 12% by weight. The composition preferably comprises the elastomeric block copolymer at a level, expressed as percentages by weight of the PPE, polyester, functionalized polyolefin-based resin and elastomeric block copolymer, of from about 2% to about 18% by weight, more preferably from about 3% to about 10% by weight, and most preferably from about 4% to about 7% by weight. Preferably the combined total weight percent of functionalized polyolefin-based resin and elastomeric block copolymer in the PPE, polyester, functionalized polyolefin-based resin and elastomeric block copolymer, is between about 3% and about 21% by weight based on the PPE, polyester, functionalized polyolefin-based resin and elastomeric block copolymer, more preferably between about 8% and about 16% by weight thereof, and most preferably between about 10% and about 14% by weight thereof.

Preferably the compositions are substantially free of additional resin materials such as polyarylene sulfides, polyamides, polyetherimides, and polycarbonate resins.

It is also possible to dilute the compatibilizing PPE with non-compatibilizing (i.e., non-functionalized) PPE to adjust the viscosity of the blend composition with the polyester resins. This discovery allows for a master batch of electrophile-containing PPE to be prepared and admixed with non-compatibilizing PPE, polyester resin, and mixture of impact modifiers, in addition to other ingredients, to make an family of similar compositions having a range of viscosities made from common starting materials to meet a variety of end-use requirements for the final compositions.

Additionally, it is also possible to obtain a composition that has a marked improvement in chemical resistance to common automotive solvents by combining an electrophile-containing PPE and polyester resin, over comparative compositions wherein the PPE was not appropriately functionalized or was insufficiently functionalized to improve the compatibility between the components. Thus, according to another embodiment of the invention, an electrophile-containing PPE is used in combination with a polyester resin and impact modifier mixture to obtain superior chemical resistance.

The present compositions exhibit improvements in ductility combined with higher tensile strengths, two properties which are critical in combination for automotive vertical body panel applications. The compositions further exhibit low moisture absorption, high heat distortion temperatures, high chemical resistance and long term heat stability. Furthermore, the present compositions exhibit enhanced falling dart impact resistance and tensile elongation at break.

Compositions of the present invention can also include effective amounts of at least one additive selected from the group consisting of anti-oxidants, flame retardants, drip retardants, crystallization nucleators, dyes, pigments, colorants, reinforcing agents, fillers, stabilizers, antistatic agents, plasticizers, and lubricants. These additives are known in the art, as are their effective levels and methods of incorporation. Effective amounts of the additives vary widely, but they are usually present in an amount up to about 50% or more by weight, based on the weight of the entire composition.

Compatible PPE-polyester blends of the present invention can be prepared by a variety of methods involving intimate admixing of the materials with any additional additives desired in the formulation. Suitable procedures include solution blending and melt blending. Because of the availability of melt blending equipment in commercial polymer processing facilities, melt processing procedures are generally preferred. Examples of equipment used in such melt compounding methods include: co-rotating and counter-rotating extruders, disc-pack processors and various other types of extrusion equipment. It is often advantageous to apply a vacuum to the melt through a vent port in the equipment to remove volatile impurities in the composition. In some instances, the compounded material exits the extruder through small exit holes in a die and the resulting strands of molten resin are cooled by passing the strands through a water bath. The cooled strands can be chopped into small pellets for packaging and further handling.

All of the ingredients may be added initially to the processing system, or else certain additives may be precompounded with each other or with one of the primary polymer components, the electrophile-containing PPE and polyester resin. It appears that certain properties, such as impact strength and elongation, are sometimes enhanced by initially precompounding the PPE with at least one of the typical agents used to prepare an electrophile-containing PPE prior to blending with the polyester resin and other components. While separate extruders may be used in the processing, these compositions may also be prepared by using a single extruder having multiple feed ports along its length to accommodate the addition of the various components. It is also sometimes advantageous to employ at least one vent port in each section between the feed ports to allow venting (either atmospheric or vacuum) of the melt. Those of ordinary skill in the art will be able to adjust blending times and temperatures, as well as component addition location and sequence, without undue additional experimentation.

It should also be clear that improved molded articles prepared from the compositions of the present invention represent an additional embodiment of this invention.

All patents cited by reference are incorporated by reference herein.

In order that those skilled in the art will be better able to practice the invention, the following examples are given by way of illustration and not by way of limitation. They are not intended to limit the invention in any aspect.

EXAMPLES

The compositions of Tables 1 and 2 were extruded on a twin-screw extruder at a temperature of about 280°–310° C. with a vacuum of 10–20 inches Hg applied to the melt during compounding. The resultant compositions were molded using an injection molding machine using a temperature set of about 280°–300° C. and a mold temperature of about 90°–110° C. Samples of the compositions were also subjected to measurement of notched Izod impact strength according to ASTM D256 (employing a sample size of 2.5 inch by 0.5 inch by 0.125 inch), Dynatup (energy to fracture, falling dart test) strength according to ASTM D3763 (using 4 inch diameter by 0.125 inch disks), flexural modulus and flexural strength according to ASTM D790 (employing a sample size of 6 inch by 0.5 inch by 0.25 inch), and tensile yield and tensile elongation at break according to ASTM D638. Delamination was determined by visual inspection.

The materials used in the following compositions were:

PPE is poly(2,6-dimethylphenylene ether) resin having an intrinsic viscosity of about 0.46 dl/gm measured in chloroform at 25° C., obtained from GE Plastics.

VVR-PPE is derived from poly(2,6-dimethylphenylene ether) resin having an intrinsic viscosity of about 0.46 dl/gm as measured in chloroform at 25° C., obtained from GE Plastics, which has been extruded with vacuum venting. The VVR-PPE was dried at about 110° C. prior to use.

PPE-EP is an epoxy functionalized PPE prepared by reacting PPE with about 4 weight percent 2chloro-4-(2,4,6-trimethylphenoxy)-6-glycidoxy-1,3,5-triazine (MGCC.).

PPE-OE is an orthoester functionalized PPE prepared by extruding 2% by weight acrylate orthoester (VII) with PPE. The PPE-OE was dried at about 110° C. prior to use.

BF-E is (polyethylene-co-12%-glycidyl methacrylate) obtained under the trademark BONDFAST E from the Sumitomo Chemical Co., Ltd.

BF-B is (polyethylene-co-7% glycidyl methacrylate-co-5%-vinyl acetate) obtained under the trademark BONDFAST 2B from the Sumitomo Chemical Co., Ltd.

IM is a polystyrene-poly(ethylene-butylene)-polystyrene type elastomeric block copolymer obtained from the Shell Chemical Co. under the trademark KRATON G1651.

PET is a poly(ethylene terephthalate) resin having an I.V. of about 0.72 as measured in a 1:1 weight to weight mixture of phenol:1,1,2,2-tetrachloroethane at 30° C. and having an acid endgroup concentration of about 20 μeq/g and a Tg of about 70°–75° C. and a Tm of about 265° C.

ADDS is a stabilization/nucleation package consisting of a weight ratio a hindered phenol:thioester:polyfluoroethylene:talc:poly-alpha-olefin of 3:3:2.5:2.5:5.

The compositions in Tables 1 and 2 are given in parts by weight.

TABLE 1

| SAMPLE: | 1 | 2 | 3 | 4 | 5 | 6 | 7 | 8 |
|---|---|---|---|---|---|---|---|---|
| PPE | 32.4 | 0 | 0 | 0 | 0 | 0 | 0 | 0 |
| VVR-PPE | 0 | 32.4 | 0 | 0 | 0 | 0 | 0 | 0 |
| PPE-EP | 0 | 0 | 32.5 | 32.5 | 32.5 | 32.5 | 32.5 | 32.5 |
| BF-B | 0 | 0 | 0 | 0 | 0 | 7.5 | 12.5 | 0 |
| BF-E | 7.5 | 7.5 | 7.5 | 12.5 | 0 | 0 | 0 | 0 |
| IM | 5 | 5 | 5 | 0 | 12.5 | 5 | 0 | 12,5 |
| PET | 54.9 | 54.9 | 55 | 55 | 55 | 55 | 55 | 55 |
| ADDS | 1.6 | 1.6 | 1.6 | 1.6 | 1.6 | 1.6 | 1.6 | 1.6 |
| PROPERTIES: | | | | | | | | |
| notched Izod; ft-lb/in | 0.2 | 0.2 | 3.5 | 2.6 | 1.7 | 2.3 | 1.8 | 1.6 |
| −20° F. notched Izod; | — | — | 1.3 | 1 | 1 | 0.8 | 0.9 | 0.7 |
| tensile strength; Kpsi | 4.0 | 4.1 | 5.6 | 5.6 | 5.8 | 5.7 | 5.9 | 6.0 |
| ultimate elongation; % | 4 B | 4 B | 28 | 24 | 24 | 28 | 28 | 18 |
| dart impact, ft-lb | — | — | 33 | 10 | 17 | 28 | 4 | 14 |
| −20° F. dart impact | — | — | 5 | 2 | 1 | 4 | 1 | 1 |
| Flexural mod., Kpsi | — | — | 277 | 273 | 275 | 267 | 275 | 290 |
| Flexural Str., Kpsi | — | — | 10.7 | 10.5 | 10.9 | 10.2 | 10.3 | 11.2 |

D is ductile; B is brittle.

As seen by the data in the table, sample 1 is a control blend containing a non-electrophile containing PPE (e.g., non-functionalized PPE) with an impact modifier mixture comprising an epoxy functionalized polyolefin-based resin and an elastomeric block copolymer, and a polyester resin. This sample upon injection molding into test parts had very poor physical properties as noted by the very low impact and tensile properties. Sample 2, utilizing vacuum vented PPE (VVR-PPE), had very similar poor physical properties. The results of these blends are typical for PPE-polyester blends that are poorly compatibilized.

When a similar composition is prepared containing PPE-EE an electrophile containing PPE, sample 3, in addition to the impact modifier mixture and polyester resin, considerably improved impact and tensile properties were achieved. This result is consistent with the theory that the electrophile-containing PPE undergoes a reaction with at least some of the other components of the blend.

Samples 4 and 5 contain the same overall level of impact modifier and the PPE-EP as sample 3 but instead of utilizing a mixture of impact modifiers, sample 4 contains only the epoxy functionalized polyolefin-based resin and sample 5 contains only the elastomeric block copolymer. Comparison samples 4 and 5 with notched Izod impact strengths of 2.6 and 1.7, respectively, to sample 3 with an impact strength of 3.5 illustrates the unexpected synergistic improvement in ductility when the mixture of impact modifiers is utilized. An even greater improvement in dart impact strength is seen comparing sample 3 with a dart impact strength of 33 to samples 4 and 5 with dart impact strengths of 10 and 17, respectively. Samples 6 and 7 utilized a polyethylene-co-7% glycidyl methacrylate-co-5% vinyl acetate copolymer as the epoxy functionalized polyolefin-based resin used in samples 3 and 4. Similar results were obtained for sample 6 using a mixture of impact modifiers versus the control samples 5 and 7 using only a single impact modifier. Thus, sample 6 illustrates the surprising improvement in the impact strength and ductility of compositions comprising the mixed impact modifiers.

As seen in FIG. 1, a transmission electron micrograph depicting the morphology of Sample 8 containing an elastomeric block copolymer without a functionalized polyolefin-based resin, the elastomeric block copolymer resides almost exclusively within the PPE particles and appears to be fairly well dispersed with the PPE particles.

Figure 2:
FIG. 2 is a transmission electron micrograph depicting the morphology of Sample 7 containing a functionalized polyolefin-based resin without an elastomeric block copolymer

As seen in FIG. 2, a transmission electron micrograph depicting the morphology of Sample 7 containing a functionalized polyolefin-based resin without an elastomeric block copolymer the functionalized polyolefin-based resin resides almost exclusively within the polyester continuous phase.

Figure 3:
FIG. 3 is a transmission electron micrograph depicting the morphology of Sample 6 containing the impact modifier mixture comprising a functionalized polyolefin-based resin and an elastomeric block copolymer.

As seen in FIG. 3, a transmission electron micrograph depicting the morphology of Sample 6 containing the impact modifier mixture comprising a functionalized polyolefin-based resin and an elastomeric block copolymer, the elastomeric block copolymer has partially moved to reside at the PPE interface with the polyester and the elastomeric block copolymer appears less dispersed within the PPE particles than when the functionalized polyolefin-based resin was absent. It is believed that the association of the elastomeric block copolymer with the interface of the PPE and the polyester is in part responsible for the enhanced ductility observed with the mixture of functionalized polyolefin-based resin and elastomeric block copolymer.

TABLE 2

| SAMPLE: | 9 | 10 | 11 |
|---|---|---|---|
| PPE-OE | 32.5 | 32.5 | 32.5 |
| BF-E |  | 12.5 | 7.5 |
| IM | 12.5 |  | 5 |
| PET | 55 | 55 | 55 |
| ADDS | 1.6 | 1.6 | 1.6 |
| PROPERTIES: |  |  |  |
| notched Izod; ft-lb/in | 1.2 | 2.2 | 2.6 |
| tensile strength; Kpsi | 6.8 | 6.5 | 6.5 |
| ultimate elongation; % | 188 D | 198 D | 207 D |

D is ductile; B is brittle.

The data in Table 2 are illustrative of compositions comprising an orthoester functionalized PPE (PPE-OE) as the electrophile-containing PPE and were made with vacuum venting of the compounding extruder. As seen with the epoxy functionalized PPE (PPE-EP) used in Table 1, sample 11, utilizing an impact modifier mixture comprising a functionalized polyolefin-based resin and an elastomeric block copolymer and the PPE-EP, had superior notched Izod impact strength and ductility, as noted by improved tensile elongation, over either sample 9 or 10 which each only contain a single impact modifier.

What is claimed:

1. A composition comprising:
   (A) an electrophilic-containing poly(phenylene ether) resin;
   (B) a thermoplastic polyester resin; and
   (C) an impact modifier mixture comprising a functionalized polyolefin-based resin and an elastomeric block copolymer wherein the electrophile-containing poly(phenylene ether) resin comprises at least one electrophilic member of the group consisting of epoxy species and orthoester species and the functionalized polyolefin-based resin comprises at least one member of the group consisting of epoxy species and orthoester species.

2. The composition of claim 1, wherein the electrophile-containing poly(phenylene ether resin) comprises groups represented by the formula

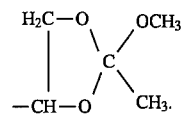

3. The composition of claim 1, wherein the electrophile-containing poly(phenylene ether) resin comprises a poly(phenylene ether) resin and a graftable unsaturated orthoester monomer.

4. The composition of claim 3, wherein the graftable unsaturated orthoester monomer is represented by the formulas:

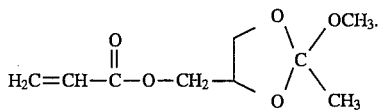

or

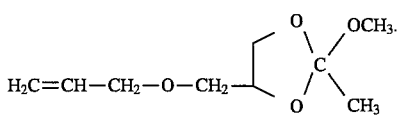

5. The composition of claim 1, wherein the electrophile-containing poly(phenylene ether) resin comprises a poly(phenylene ether) resin and a compound containing both
   (i) a triazine group; and
   (ii) an epoxy or orthoester group.

6. The composition of claim 1, wherein the functionalized polyolefin-based resin is copolymer of an α-olefin with a glycidyl ester of an α,β-unsaturated carboxylic acid.

7. The composition of claim 1, wherein the elastomeric block copolymer is selected from the group consisting of vinyl aromatic-conjugated diene block copolymers, partially hydrogenated vinyl aromatic-conjugated diene block copolymers, entirely hydrogenated vinyl aromatic-conjugated diene block copolymers, and mixtures thereof.

8. The composition of claim 1, wherein the polyester is the continuous phase.

9. The composition of claim 8, wherein, based on the total weight of components (A), (B) and (C), component (A) is present from about 10% to about 60% by weight and component (B) is present from about 85% to about 25% by weight, and component (C) is present from about 3% to about 20% by weight.

10. The composition of claim 1, further comprising at least one additive selected from the group consisting of impact modifiers, reinforcing fillers, flow promoters, flame retardants, drip retardants, dyes, pigments, colorants, stabilizers, antistatic agents, plasticizers, non-reinforcing fillers, and lubricants.

11. An article made from the composition of claim 1.

12. The composition according to claim 1, further comprising at least one unfunctionalized polyolefin-based resin.

13. The composition according to claim 8, further having an ultimate tensile elongation value in excess of 25% and a notched Izod impact strength in excess of 2 foot-pounds/inch.

14. A method to prepare the composition of claim 1 comprising: (1) preblending a functionalizing agent with a poly(phenylene ether) resin to make a electrophile-containing poly(phenylene ether) resin and (2) admixing said electrophile-containing poly(phenylene ether) resin with a mixture comprising a polyester resin and an impact modifier mixture comprising a functionalized polyolefin-based resin and an elastomeric block copolymer.

15. A composition consisting essentially of (A) an electrophilic-containing poly(phenylene ether) resin;

(B) a thermoplastic polyester resin; and (C) an impact modifier mixture comprising a functionalized polyolefin-based resin and an elastomeric block copolymer wherein the electrophile-containing poly(phenylene ether) resin comprises at least one electrophilic member of the group consisting of epoxy species and orthoester species and the functionalized polyolefin-based resin comprises at least one member of the group consisting of epoxy species and orthoester species.

* * * * *

UNITED STATES PATENT AND TRADEMARK OFFICE
CERTIFICATE OF CORRECTION

PATENT NO. : 5,583,179
DATED : December 10, 1996
INVENTOR(S) : Chorng-Fure R. Hwang, et al.

It is certified that error appears in the above-indentified patent and that said Letters Patent is hereby corrected as shown below:

On the title page, item [75] Inventors: Please add "Sterling B. Brown".

Signed and Sealed this

Ninth Day of September, 1997

Attest:

BRUCE LEHMAN

Attesting Officer     Commissioner of Patents and Trademarks